May 27, 1941.　　　A. E. FIALA　　　2,243,312
RACK
Filed Feb. 5, 1940　　　2 Sheets-Sheet 2
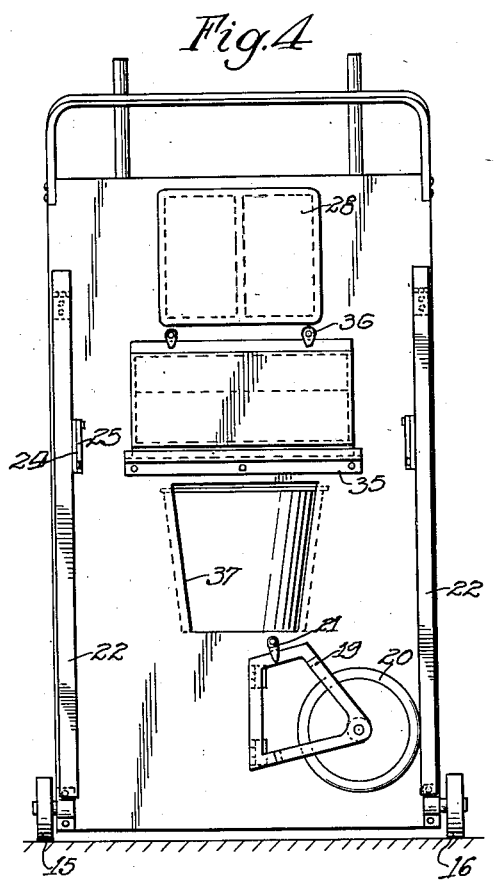
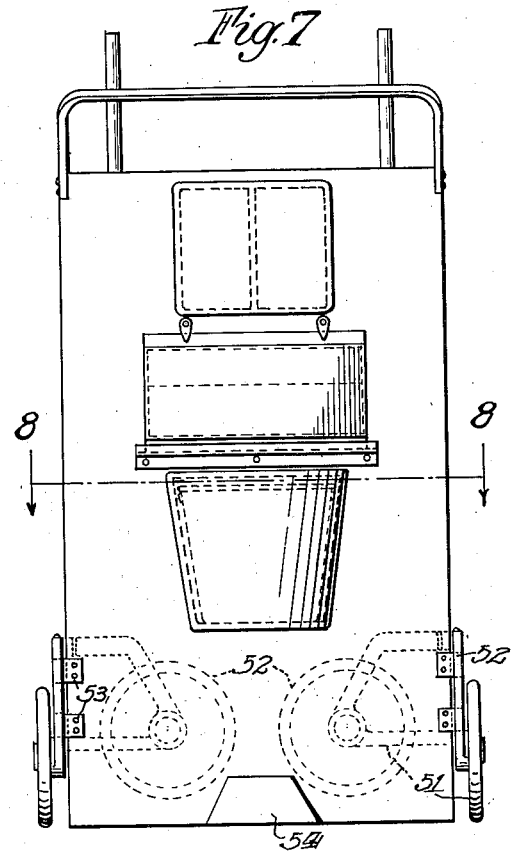
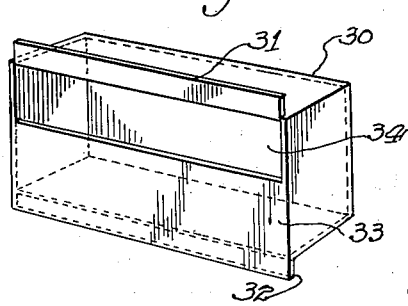
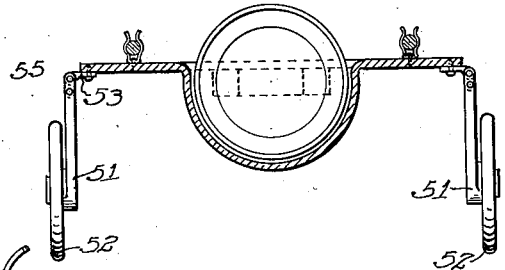
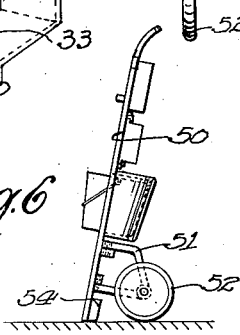
Inventor
Albert E. Fiala
by Henry Blech
Attorney.

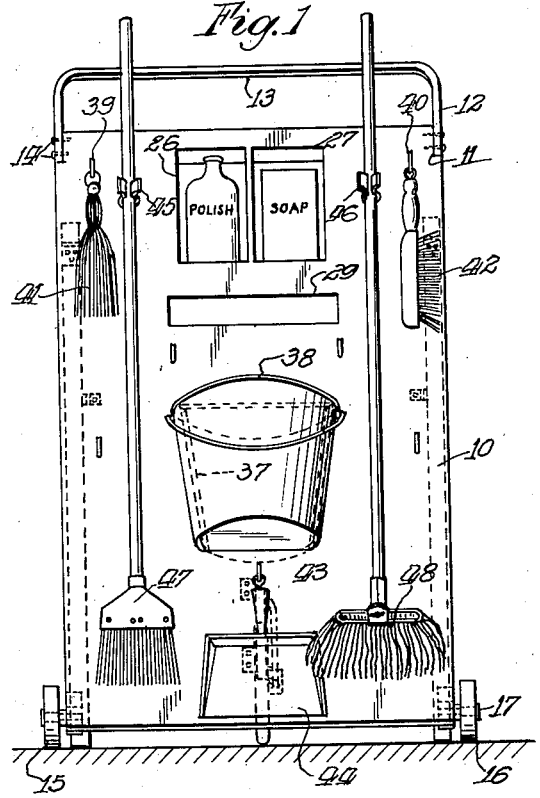
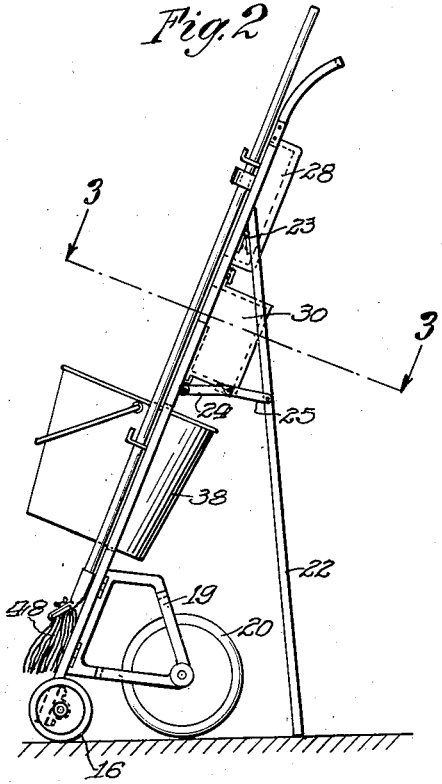
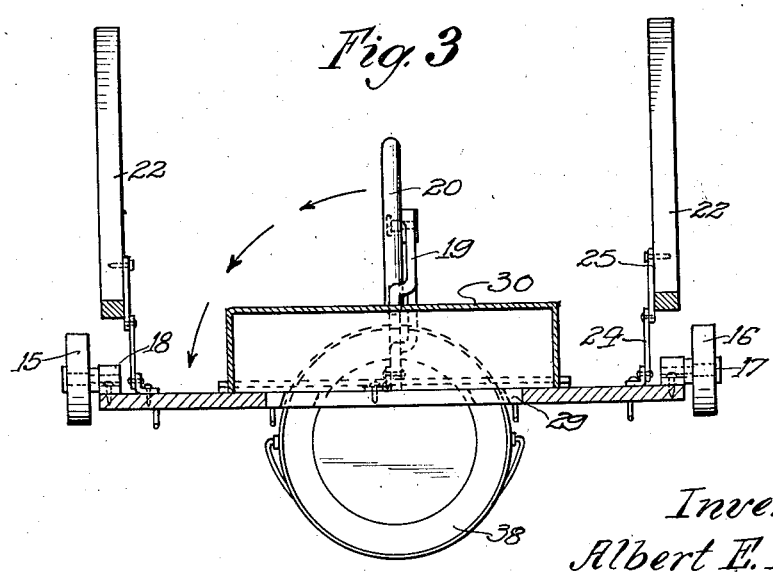

Patented May 27, 1941

2,243,312

UNITED STATES PATENT OFFICE 2,243,312

RACK

Albert E. Fiala, Chicago, Ill.

Application February 5, 1940, Serial No. 317,336

2 Claims. (Cl. 280—53)

The invention relates to utensil racks, particularly adapted for convenient storing of utensils and tools.

It is an object of the invention to provide an ambulatory rack which can be placed in position most needed and removed when used as a storage medium.

A further object aims at producing a rack which may be stored in collapsed or compact arrangement and capable of being carted and unfolded for stable balance.

A still further object constitutes the provision of a rack capable of holding a number of household utensils which may be conveniently removed and, after use, replaced.

Another object constitutes the provision of an ambulatory rack which is counterbalanced to be maintained substantially in upright position and remain stationary, and which may be tilted to enable locomotion.

It is also an object to provide certain features of construction and arrangement tending to enhance the utility and efficiency of a device of the character described.

With these and many other objects in view, which will become apparent from a perusal of the invention, the latter comprises the means described in the following specification, particularly pointed out in the claims forming a part thereof, and illustrated in the accompanying drawings, in which:

Fig. 1 is a front elevational view of the rack constructed in accordance with my invention, Fig. 2 is a side view, Fig. 3 is a section on the line 3—3 of Fig. 2, Fig. 4 is a rear elevational view of the rack, Fig. 5 is a perspective view of a receptacle mounted on the rack, Fig. 6 is a reduced side view of a modified rack, Fig. 7 is a rear elevational view of the modified rack, and Fig. 8 is a section on the line 8—8 of Fig. 7.

Referring to the drawings, 10 designates a board of rectangular shape which may be made of wood or any other suitable or preferred material. At the upper corners, the board is recessed as at 11 to receive the downwardly extending ends 12 of a handle bar 13. The ends 12 are secured to the board by screws 14. The board is provided with wheels 15 and 16, which are mounted on studs 17 secured in bearings 18 at the lower rear corners of the board.

A frame 19 is hingedly connected at the center on the rear side of the board and carries a comparatively large rear wheel 20 which, when the frame is swung into position at right angles to the board, engages the floor and, in conjunction with the wheels 15 and 16, forms a support for the board and provides for locomotion to facilitate moving of the rack to any desired position.

To support the board in stable arrangement, the frame 19 is swung into contact with the board and secured thereto by a clamp 21 (Fig. 4).

The board is provided with supporting legs 22 hingedly connected to the board as at 23 and provided with connecting links 24, 25, pivotally secured to the board and legs, respectively, to limit the extent to which the legs may be swung out and to constitute a stable support for the board.

The board is provided with openings 26 and 27 leading to a receptacle 28 for the storage of a bottle or other container. It may be pointed out that the description of the various utensils and their arrangement on the board is merely illustrative and may be varied to meet particular requirements or desires.

A slot-like opening 29 leads to a receptacle 30, primarily intended as a repository for sweepings, ashes or other debris. The receptacle is of rectangular shape and has a flange 31 and a flange 32 at the front wall 33. An opening 34 in the front wall corresponds to the opening 29.

The board is provided with a retaining cleat or guide way 35 into which the flange 32 is received, and clamps 36 engage the flange 31 to secure the receptacle to the board.

The board has also a large opening 37, into which a pail or bucket 38 may be partly inserted to be held therein by engagement with the edges of said opening.

Hangers 39 and 40 on the board serves to hold brooms 41 and 42, respectively, and a hanger 43 holds a dustpan 44. Clamps 45 and 46, respectively, receive the handle of a broom 47 and a mop 48.

As indicated before, the particular kind of utensils employed or the mode and manner of attachment may be varied at will and is merely indicated by way of example without any limitations.

The modification shown in Figs. 6 to 8 dispenses with the wheels 15 and 16, but instead, provides for a board 50 which, at each side near the lower end, has a folding frame 51 carrying a comparatively large wheel 52, said frame 51 being connected to the board by a hinge 53.

A weight 54 at the lower end of the board, upon the wheels extending at right angles to the board and engaging the floor, holds the board in engagement with the floor. To cart the rack, the handle bar 13' is seized and the board slightly tilted so that locomotion may be had by a pushing force.

In order to maintain the frames 51 at right angles to the board, a pin 55 is inserted in aligning apertures provided in the frame 51 and hinge 52. If desired, an automatically locking hinge may be employed, as may be readily obtainable on the market.

With the modification shown in Fig. 6, it is easy to move the rack along stairways, the size of the wheels affording smooth moving along the steps.

It is evident that either modification of the racks provides for a handy, ambulatory compact rack which, when in use, may be easily set up for substantially vertical position.

When not in use, the wheel frames may be folded upon the board which then requires little space for storing in a closet or other part of a room.

While the drawings show preferred embodiments of the invention, numerous changes and alterations may be made without departing from the spirit of the invention.

I, therefore, do not limit myself to the details of construction and arrangement, as shown, but wish to include all changes, variations, modifications and revisions constituting departures within the scope of the invention, as defined in the appended claims.

I claim:

1. A utensil rack for household use, including a body, wheels on the lower part of said body for locomotion, and a counterbalancing weight secured to said body below the axis of said wheels to maintain said rack in substantially vertical position.

2. A utensil rack for household use, including a body, collapsible wheels on the lower part of said body for locomotion, said wheels contacting flatwise with said body when collapsed, and a counterbalancing weight secured to said body below the axis of said wheels to maintain said rack in substantially vertical position when the wheels are in operative position.

ALBERT E. FIALA.